US012755684B2

(12) United States Patent
Park et al.

(10) Patent No.: US 12,755,684 B2
(45) Date of Patent: Oct. 6, 2026

(54) DEGRADATION COMPENSATION CIRCUIT AND DISPLAY DEVICE INCLUDING THE SAME

(71) Applicant: LG Display Co., Ltd., Seoul (KR)

(72) Inventors: Kwanwoong Park, Gumi-si (KR); Byunghun Lee, Daegu (KR); Jaehyeon Woo, Busan (KR)

(73) Assignee: LG DISPLAY CO., LTD., Seoul (KR)

( * ) Notice: Subject to any disclaimer, the term of this patent is extended or adjusted under 35 U.S.C. 154(b) by 140 days.

(21) Appl. No.: 17/972,276

(22) Filed: Oct. 24, 2022

(65) Prior Publication Data

US 2023/0154397 A1 May 18, 2023

(30) Foreign Application Priority Data

Nov. 16, 2021 (KR) ........................ 10-2021-0157406

(51) Int. Cl.
*G09G 3/3208* (2016.01)

(52) U.S. Cl.
CPC ....... *G09G 3/3208* (2013.01); *G09G 2310/08* (2013.01); *G09G 2330/04* (2013.01); *G09G 2330/06* (2013.01)

(58) Field of Classification Search
CPC .................................................... G09G 3/3208
See application file for complete search history.

(56) References Cited

U.S. PATENT DOCUMENTS 9,665,220 B2 5/2017 Park et al.
9,697,769 B2 7/2017 Kishi et al.
9,905,160 B2 2/2018 Woo et al.
9,990,888 B2 6/2018 Oh et al.
10,297,193 B2 5/2019 Hwang et al.
(Continued)

FOREIGN PATENT DOCUMENTS

CN 105339998 A 2/2016
CN 105427796 A 3/2016
(Continued)

OTHER PUBLICATIONS

Korean Notice of Allowance for Korean Application No. 10-2021-0157406, dated Jun. 4, 2025, with English translation.

*Primary Examiner* — William Boddie
(74) *Attorney, Agent, or Firm* — Birch, Stewart, Kolasch & Birch, LLP

(57) ABSTRACT

A degradation compensation circuit and a display device including the same are discussed. When noise is included in sensed data indicating a degradation amount of a display panel, the degradation compensation circuit cancels the noise component and/or an effect of the noise component on degradation compensation. The degradation compensation circuit can receive initial sensed data indicating a characteristic of a display panel from a sensing circuit for sensing a pixel signal of the display panel, store therein a first noise level of the initial sensed data at each pixel coordinate, receive current sensed data indicating degradation of the display panel from the sensing circuit, correct a second noise level of the current sensed data to the first noise level of the initial sensed data, calculate a difference between the current sensed data and the initial sensed data, and extract degradation compensation data corresponding to the difference.

15 Claims, 7 Drawing Sheets

(56) References Cited

U.S. PATENT DOCUMENTS

| | | | | |
|---|---|---|---|---|
| 11,328,673 | B2 | 5/2022 | Kim et al. | |
| 11,501,716 | B2 | 11/2022 | An et al. | |
| 11,670,240 | B2 | 6/2023 | Kim et al. | |
| 12,051,372 | B2 | 7/2024 | Kim et al. | |
| 2014/0198092 | A1 | 7/2014 | Azizi et al. | |
| 2015/0220177 | A1* | 8/2015 | Park | G06F 3/044 345/174 |
| 2015/0373291 | A1 | 12/2015 | Oh et al. | |
| 2016/0078805 | A1 | 3/2016 | Woo et al. | |
| 2017/0069238 | A1* | 3/2017 | Moon | G09G 3/006 |
| 2017/0076660 | A1* | 3/2017 | Lee | G09G 3/3208 |
| 2017/0256199 | A1* | 9/2017 | Bi | G09G 3/3233 |
| 2017/0372656 | A1* | 12/2017 | Furukawa | G09G 3/3275 |
| 2018/0075798 | A1 | 3/2018 | Nho et al. | |
| 2019/0244555 | A1 | 8/2019 | Lin et al. | |
| 2020/0372861 | A1* | 11/2020 | Ok | G09G 3/3233 |

FOREIGN PATENT DOCUMENTS

| | | | |
|---|---|---|---|
| CN | 105590586 | A | 5/2016 |
| CN | 109791753 | A | 5/2019 |
| CN | 113409736 | A | 8/2021 |
| CN | 113409734 | A | 9/2021 |
| KR | 10-2014-0078504 | A | 6/2014 |
| KR | 10-2016-0094129 | A | 8/2016 |
| KR | 10-2017-0055067 | A | 5/2017 |
| KR | 10-2020-0070996 | A | 6/2020 |
| KR | 10-2215876 | B1 | 2/2021 |
| KR | 10-2021-0040588 | A | 4/2021 |

* cited by examiner

DEGRADATION COMPENSATION CIRCUIT AND DISPLAY DEVICE INCLUDING THE SAME

CROSS-REFERENCE TO RELATED APPLICATION

This application claims priority under 35 U.S.C. 119 to Korean Patent Application No. 10-2021-0157406, filed on Nov. 16, 2021 in the Korean Intellectual Property Office, the entire contents of which are hereby expressly incorporated by reference into the present application.

BACKGROUND

Field

The present disclosure relates to a degradation compensation circuit and a display device including the same.

Discussion of the Related Art

As the information society develops, demand for a display device for displaying an image is increasing in various forms. Thus, various types of display devices such as liquid crystal display devices and organic light-emitting display devices are being used.

Among the above display devices, the organic light-emitting display device includes an organic light-emitting diode (OLED) which has excellent response speed, wide field of view (FOV), and color reproducibility and thus is in the spotlight.

The organic light-emitting display device includes the organic light-emitting diode that emits light based on driving current, and a pixel circuit that supplies the driving current to the organic light-emitting diode in each pixel. However, the organic light-emitting diode can be degraded over time, etc., so that there can be a limitation in that uniformity of an image can be lowered.

Therefore, compensating for the degradation of the organic light-emitting diode to secure the uniformity of the image and to prevent deterioration of image quality is needed.

SUMMARY OF THE DISCLOSURE

In a display panel, a transistor in a pixel circuit can be damaged due to inflow of static electricity into the display panel during a manufacturing process thereof.

When the characteristics of the transistor change instantaneously due to the static electricity, noise is included in sensed data obtained by sensing a pixel signal. Then, when the static electricity accumulated in the transistor is discharged after a certain period of time, the transistor characteristic returns to its original state, and thus the noise disappears in the sensed data obtained by sensing the pixel signal.

In this way, a specific transistor of one sample has first noise during a process, and then the noise disappears after a certain period of time. Thus, a difference value between current sensed data and initial sensed data varies in degradation compensation. A vertical line can occur on the display panel.

A general concept of the degradation compensation includes obtaining a difference between sensed data before aging of a light-emitting element such as the organic light-emitting diode element and sensed data after aging thereof, and compensating for degradation based on the difference.

When the sensed data includes noise, a vertical line can occur after the degradation compensation. Accordingly, the inventors of the present application have invented a degradation compensation circuit capable of eliminating the noise included in sensed data and/or an effect of the noise on the degradation compensation and a display device including the same.

A purpose according to one embodiment of the present disclosure is to provide a degradation compensation circuit that can cancel a noise component and/or an effect of the noise component on the degradation compensation when sensed data indicating a degradation amount of a display panel includes the noise component, and a display device including the same.

Purposes of the present disclosure are not limited to the above-mentioned purpose. Other purposes and advantages of the present disclosure that are not mentioned can be understood based on following descriptions, and can be more clearly understood based on embodiments of the present disclosure. Further, it will be easily understood that the purposes and advantages of the present disclosure can be realized using means shown in the claims and combinations thereof.

A first aspect of the present disclosure provides a degradation compensation circuit for compensating for degradation of a display device. The degradation compensation circuit can receive initial sensed data indicating characteristic of a display panel of the display device from a sensing circuit for sensing a pixel signal of the display panel, store therein a first noise level of the initial sensed data at each pixel coordinate, receive current sensed data indicating degradation of the display panel from the sensing circuit, correct a second noise level of the current sensed data to the first noise level of the initial sensed data, calculate a difference between the current sensed data and the initial sensed data, and extract degradation compensation data corresponding to the difference.

In one implementation of the degradation compensation circuit, the degradation compensation circuit is further configured to, when noise is included in the initial sensed data, store therein the first noise level of the initial sensed data and a pixel coordinate of a pixel having the first noise level.

In one implementation of the degradation compensation circuit, the degradation compensation circuit is further configured to, when the initial sensed data exceeds a reference value, determine that noise is included in the initial sensed data at the pixel coordinate.

In one implementation of the degradation compensation circuit, the degradation compensation circuit is further configured to compare the second noise level and the first noise level at each pixel coordinate with each other, and when second noise level and the first noise level are not equal to each other, correct the second noise level to the first noise level.

In one implementation of the degradation compensation circuit, the degradation compensation circuit is further configured to calculate a difference between the initial sensed data and the current sensed data, and remove noise included in the difference.

In one implementation of the degradation compensation circuit, the degradation compensation circuit is further configured to store therein a value of the difference at each pixel coordinate.

In one implementation of the degradation compensation circuit, the degradation compensation circuit is further configured to extract the degradation compensation data corresponding to the value of the difference from a preset lookup table, and apply the degradation compensation data to image data.

In one implementation of the degradation compensation circuit, the degradation compensation circuit is further configured to receive the initial sensed data from the sensing circuit sensing the pixel signal of the display panel during an initial operation of the display panel, and determine whether the first noise level is present based on the received initial sensed data.

In one implementation of the degradation compensation circuit, the degradation compensation circuit is further configured to receive the current sensed data from the sensing circuit in a preset period of a display period after the initial operation of the display panel, and compare the second noise level with the first noise level with each other.

A second aspect of the present disclosure provides a display device including a display panel including a plurality of pixels, a sensing circuit configured to sense a pixel signal from the display panel, convert the pixel signal into sensed data, and provide the sensed data as initial sensed data or current sensed data, and a degradation compensation circuit configured to compensate for degradation of the display panel, wherein the degradation compensation circuit is configured to receive the initial sensed data indicating characteristic of the display panel, store a first noise level of the initial sensed data at each pixel coordinate in a memory, receive the current sensed data indicating degradation of the display panel from the sensing circuit, correct a second noise level of the current sensed data to the first noise level of the initial sensed data, calculate a difference between the current sensed data and the initial sensed data, and extract degradation compensation data corresponding to the difference.

In one implementation of the display device, the degradation compensation circuit is further configured to, when noise is included in the initial sensed data, store the first noise level of the initial sensed data and a pixel coordinate of a pixel having the first noise level in the memory.

In one implementation of the display device, the degradation compensation circuit is further configured to, when the initial sensed data exceeds a reference value, determine that noise is included in the initial sensed data at the pixel coordinate.

In one implementation of the display device, the degradation compensation circuit is further configured to compare the second noise level and the first noise level at each pixel coordinate with each other, and when second noise level and the first noise level are not equal to each other, correct the second noise level to the first noise level.

In one implementation of the display device, the degradation compensation circuit is further configured to calculate a difference between the initial sensed data and the current sensed data, and remove noise included in the difference.

In one implementation of the display device, the degradation compensation circuit is further configured to store a value of the difference at each pixel coordinate in the memory.

In one implementation of the display device, the degradation compensation circuit is further configured to extract the degradation compensation data corresponding to the value of the difference from a preset lookup table, and apply the degradation compensation data to image data.

In one implementation of the display device, the degradation compensation circuit is further configured to receive the initial sensed data from the sensing circuit sensing the pixel signal of the display panel during an initial operation of the display panel, and determine whether the first noise level is present based on the received initial sensed data.

In one implementation of the display device, the degradation compensation circuit is further configured to receive the current sensed data from the sensing circuit in a preset period of a display period after the initial operation of the display panel, and compare the second noise level with the first noise level with each other.

In one implementation of the display device, the sensing circuit is included in a source driver, the source driver outputs a source signal corresponding to image data to the display panel, the degradation compensation circuit is included in a timing controller, and the timing controller provides the image data to the source driver. The degradation compensation circuit is further configured to apply the degradation compensation data to the image data to obtain compensated image data, and supply the compensated image data to the source driver.

In one implementation of the display device, the degradation compensation circuit is included in a source driver, the source driver outputs a source signal corresponding to image data to the display panel, and the degradation compensation circuit is further configured to apply the degradation compensation data to the image data received from the timing controller.

When the noise is included in the initial sensed data, the degradation compensation circuit according to one embodiment and the display device including the same can correct the noise level of the current sensed data to the noise level of the noised included in the initial sensed data and maintains the corrected noise level of the current sensed data. Thus, the noise can be canceled when the difference between the initial sensed data and the current sensed data is calculated.

Further, the degradation compensation circuit according to one embodiment and the display device including the same can eliminate the noise of the sensed data and/or an effect of the noise on the degradation compensation to accurately compensate for the degradation characteristic of each pixel.

Further, the degradation compensation circuit according to one embodiment and the display device including the same can accurately compensate for the degradation characteristic of each pixel to ensure uniformity of the image, thereby preventing the deterioration of the image quality of a display panel such as an organic light-emitting diode panel.

Effects of the present disclosure are not limited to the above-mentioned effects, and other effects as not mentioned will be clearly understood by those skilled in the art from following descriptions.

BRIEF DESCRIPTION OF DRAWINGS

The present disclosure will become more fully understood from the detailed description given hereinbelow and the accompanying drawings which are given by way of illustration only, and thus are not limitative of the present disclosure.

DETAILED DESCRIPTIONS OF THE EMBODIMENTS

Figure 1:
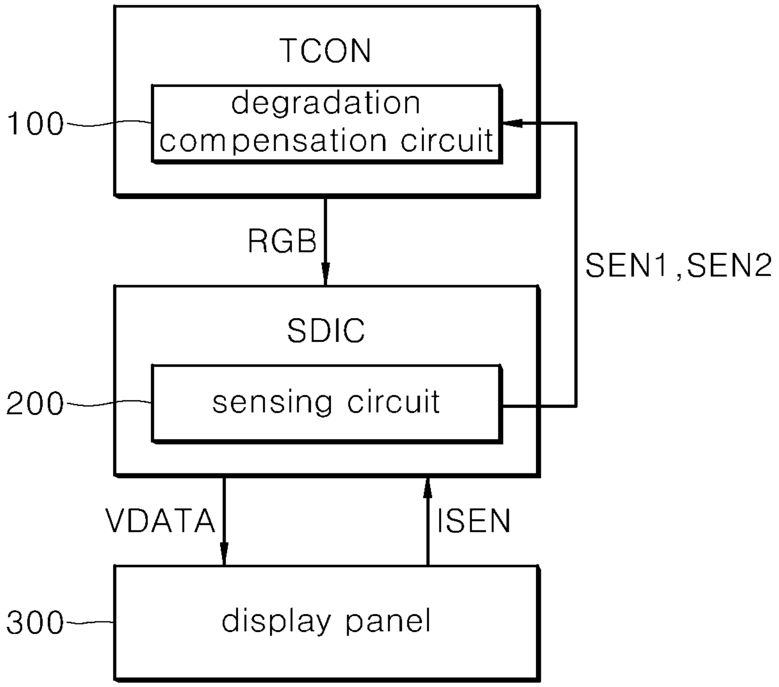
FIG. 1 is a block diagram of a display device including a degradation compensation circuit according to one embodiment of the present disclosure.

Advantages and features of the present disclosure, and a method of achieving the advantages and features will become apparent with reference to embodiments described later in detail together with the accompanying drawings. However, the present disclosure is not limited to the embodiments as disclosed below, but can be implemented in various different forms. Thus, these embodiments are set forth only to make the present disclosure complete, and to completely inform the scope of the disclosure to those of ordinary skill in the technical field to which the present disclosure belongs, and the present disclosure is only defined by the scope of the claims.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements may be omitted or may be provided briefly for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "comprising" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements can modify the entire list of elements and may not modify the individual elements of the list. In interpretation of numerical values, an error or tolerance therein can occur even when there is no explicit description thereof.

In addition, it will also be understood that when a first element or layer is referred to as being present "on" a second element or layer, the first element or layer can be disposed directly on the second element or layer or can be disposed indirectly on the second element or layer with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

In descriptions of temporal relationships, for example, temporal precedent relationships between two events such as "after", "subsequent to", "before", etc., another event can occur therebetween unless "directly after", "directly subsequent" or "directly before" is indicated.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure can be partially or entirely combined with each other, and can be technically associated with each other or operate with each other. The embodiments can be implemented independently of each other and can be implemented together in an association relationship.

As used herein, the term "substantially," "about," and similar terms are used as terms of approximation, and are intended to account for inherent deviations in measured or calculated values that would be recognized by those of ordinary skill in the art. The term can be used to prevent unauthorized exploitation by an unauthorized infringer to design around accurate or absolute figures provided to help understand the present disclosure.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In description of a signal flow relationship, for example, even when 'a signal is transmitted from a node A to a node B', a signal can be transmitted from the node A to the node B via another node unless 'immediately' or 'directly' is used.

Hereinafter, a degradation compensation circuit and a display device including the same according to some embodiments of the present disclosure will be described. All the components of each display device according to all embodiments of the present disclosure are operatively coupled and configured.

Prior to the description of the degradation compensation circuit and the display device including the same according to the embodiment, meanings of terms as used herein are defined.

As used herein, initial sensed data refers to data as a digital signal to which an analog signal sensed from a pixel of a display panel such as an organic light-emitting diode panel during an initial operation of the display device is converted. The initial sensed data can indicate pixel characteristics of the display panel such as the organic light-emitting diode panel. In one example, the pixel characteristics can include a threshold voltage of a light-emitting element such as an organic light-emitting diode or a threshold voltage and mobility of a driving transistor.

As used herein, current sensed data refers to data as a digital signal to which an analog signal sensed from a pixel of a display panel such as an organic light-emitting diode panel during a display operation of the display device is converted. The current sensed data indicates degradation of the display panel such as the organic light-emitting diode panel over time. In one example, the current sensed data can be sensed in a preset degradation compensation period or a blank period in a display period.

As used herein, degradation compensation data can be defined as data for compensating for the degradation characteristic of the display panel. In one example, the degradation compensation data as a compensation value corresponding to a difference between the current sensed data and the initial sensed data can be preset in a lookup table.

Note that the present disclosure will be mainly described below in conjunction with an exemplary case in which the display panel is an organic light emitting diode panel. However, as can be understood by those skilled in the art, the present disclosure can be similarly applied to another display panel.

FIG. 1 is a block diagram of a degradation compensation circuit according to one embodiment and a display device including the same.

Referring to FIG. 1, a display device includes a display panel 300, a source driver SDIC and a timing controller TCON.

In the display panel 300, a plurality of pixels can be respectively disposed at intersections between a plurality of gate lines and a plurality of data lines. Each pixel can include an organic light-emitting diode (OLED) and a pixel circuit that supplies driving current to the organic light-emitting diode.

The pixel circuit of the display panel 300 receives a source signal VDATA from the source driver SDIC, generates the driving current, and supplies the driving current to the organic light-emitting diode such that the diode emits light.

The source driver SDIC receives image data RGB from the timing controller TCON, and provides the source signal VDATA corresponding to the image data RGB to the display panel 300.

In the drawing, one source driver SDIC is illustrated for convenience of description. However, the present disclosure is not limited thereto. A plurality of source drivers can be included based on a size and resolution of the display panel 300.

The source driver SDIC can include a sensing circuit 200. The sensing circuit 200 senses a pixel signal ISEN of the display panel 300 and converts the pixel signal ISEN into sensed data.

The sensing circuit 200 can provide the sensed data as initial sensed data SEN1 or current sensed data SEN2 to a degradation compensation circuit 100. In this regard, the initial sensed data SEN1 refers to data as a digital signal to which an analog signal sensed from the pixel of the display panel 300 during an initial operation of the display device is converted.

The initial sensed data SEN1 can indicate the pixel characteristic of the display panel 300. The pixel characteristic can include a threshold voltage of an organic light-emitting diode or a threshold voltage and mobility of a driving transistor.

The current sensed data SEN2 refers to data as a digital signal to which an analog signal sensed from the pixel of the display panel 300 during a display operation of the display device is converted. The current sensed data SEN2 can indicate an amount of the degradation of the display panel 300 as a display time elapses. In one example, the current sensed data SEN2 can be sensed in the preset degradation compensation period or the blank period of the display period.

In another example, the source driver SDIC can include a latch circuit that latches the image data RGB, a digital-to-analog converter that converts the image data RGB to the source signal VDATA, and an output buffer that outputs the source signal VDATA to the display panel 300.

In one example, an example in which the sensing circuit 200 is included in the source driver SDIC is illustrated. However, the present disclosure is not limited thereto. The sensing circuit 200 can be separately disposed out of the source driver SDIC and sense the pixel signal of the display panel 300.

In one example, the sensing circuit 200 can include a sampling circuit for sampling a pixel signal, an amplifier for amplifying a pixel signal, and an analog-to-digital converter for converting a pixel signal into sensed data as a digital signal.

The timing controller TCON provides the image data RGB to the source driver SDIC. The timing controller TCON can include the degradation compensation circuit 100. The degradation compensation circuit 100 can receive, from the sensing circuit 200, the initial sensed data SEN1 or the current sensed data SEN2 as the sensed data corresponding to the pixel signal ISEN.

Upon receiving the initial sensed data SEN1 corresponding to the characteristic of the display panel 300 from the sensing circuit 200, the degradation compensation circuit 100 can store a first noise level of the initial sensed data SEN1 at each pixel coordinate.

The degradation compensation circuit 100 can receive the current sensed data SEN2 corresponding to the degradation of the display panel 300 from the sensing circuit 200 and can correct a second noise level of the current sensed data SEN2 to the first noise level of the initial sensed data SEN1.

The degradation compensation circuit 100 can calculate a difference between the current sensed data SEN2 and the initial sensed data SEN1 and can extract degradation compensation data corresponding to the difference from the preset lookup table.

Figure 2:
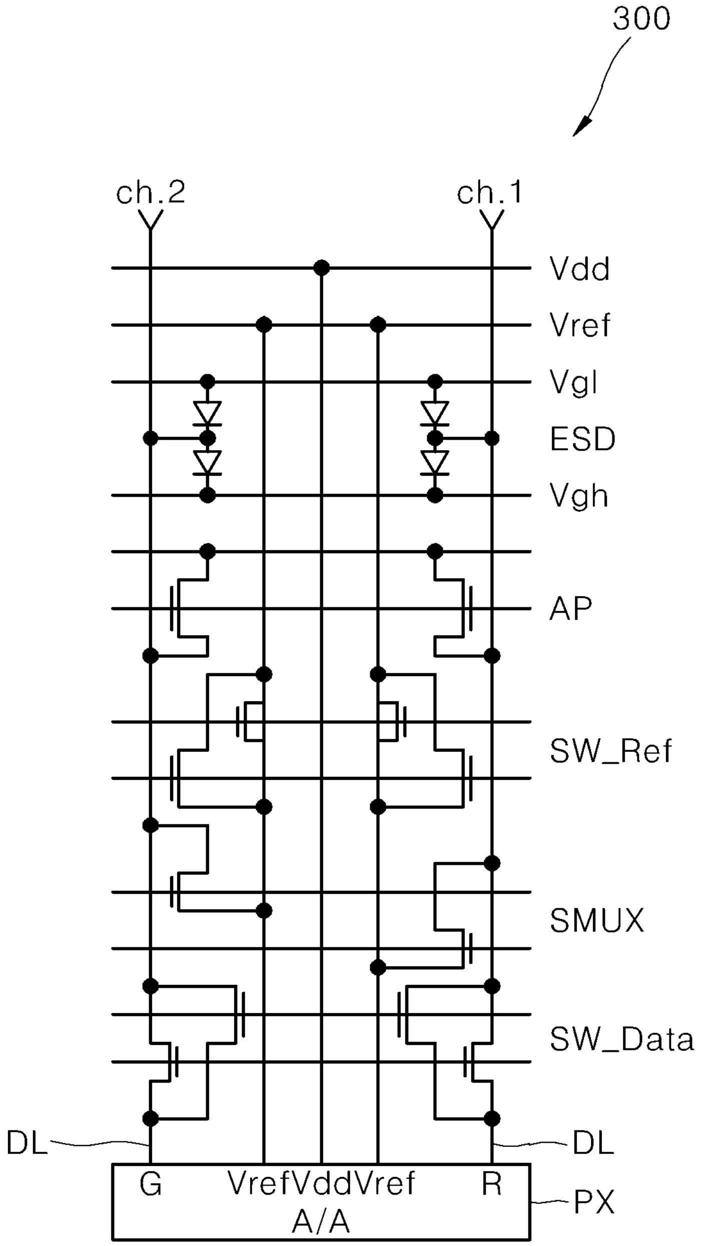
FIG. 2 is a circuit diagram of a non-active area of a display panel shown in FIG. 1.

FIG. 2 is a circuit diagram of a non-active area of the display panel 300 shown in FIG. 1.

FIG. 2 shows two channels ch.1 and ch.2 for convenience of description. However, the present disclosure is not limited thereto. A plurality of channels for R, G, and B of the display panel 300 can be included. Each of the channels can be connected to the source driver SDIC, and can receive each source signal for each of R, G, and B from the source driver SDIC.

Referring to FIG. 2, the display panel 300 can be divided into a non-active area and an active area A/A. In one example, switches that transmit power voltage, reference voltage and a source signal can be included in the non-active area, and pixel circuits PX can be included in the active area A/A. In this regard, the first channel ch.1 and the second channel ch.2 are electrically connected to a data line DL of the pixel circuit PX.

The display panel 300 can include a data switch SW_Data, a mux switch SMUX, a reference voltage switch SW Ref, a probe switch AP, and a static electricity discharge protective circuit (ESD) in the non-active area.

The data switch SW_Data transmits the source signal output from the source driver SDIC to the pixel circuit PX of the active area A/A via the first channel ch.1 and the second channel ch.2.

The reference voltage switch SW_Ref transfers reference voltage Vref to the pixel circuit PX of the active area A/A via a reference voltage line. In one example, the reference voltage switch SW_Ref can be turned on during an initialization period of the pixel circuit PX.

The power voltage Vdd is supplied to the active area of the display panel 300 via a power voltage line.

The mux switch SMUX transmits the reference voltage Vref to the pixel circuit PX in the active area via the first channel ch.1 and the second channel ch.2. In one example, the mux switch SMUX can be turned on during a programming period of the pixel circuit PX, and can transmit the reference voltage Vref to the pixel circuit PX via the first channel ch.1 and the second channel ch.2 for programming.

The probe switch AP is used to sense a defect of the display panel 300. In one example, the probe switch AP can short-circuit the first channel ch.1 and the second channel ch.2 during a defect test. An external test device can compare a level of a sensed signal transmitted through the probe switch AP with a preset test voltage and check whether data lines of the display panel 300 are shorted-circuit, based on the comparing result.

When static electricity discharge flows through the first channel ch.1 or the second channel ch.2, the static electricity discharge protective circuit ESD prevents an internal circuit of the display panel 300 from being damaged due to the static electricity discharge.

In one example, the static electricity discharge protective circuit ESD can include a first diode and a second diode connected in series with each other and disposed between a high voltage line Vgh and a low voltage line Vgl. In this regard, a node between the first diode and the second diode can be connected to the first channel ch.1 or the second channel ch.2.

The static electricity discharge protective circuit ESD can be provided for each channel. When static electricity discharge flows through the first channel ch.1 or the second channel ch.2, the static electricity discharge can be grounded to an outside via the first diode and the second diode. Thus, the display panel 300 can be protected therefrom.

Figure 3:
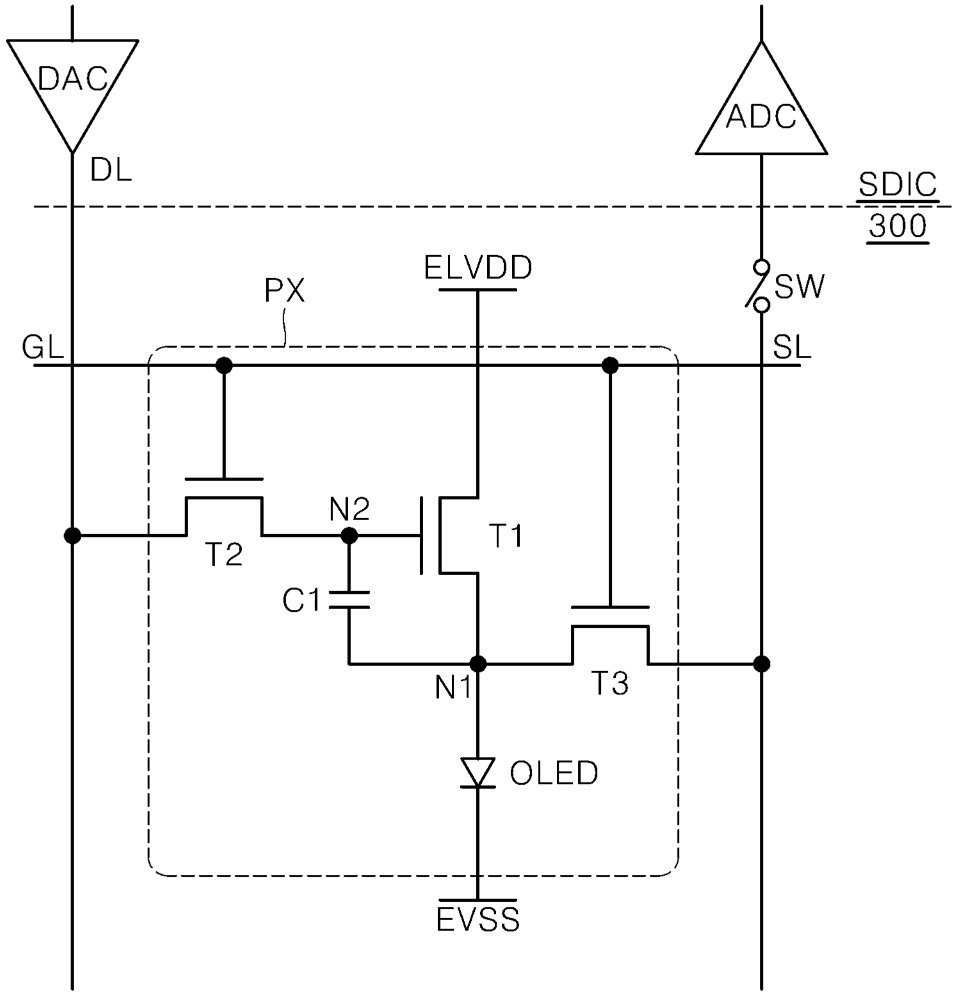
FIG. 3 shows an example of a pixel circuit of an active area of the display panel shown in FIG. 1.

FIG. 3 shows an example of a pixel circuit in the display panel 300 shown in FIG. 1.

Referring to FIG. 3, the pixel circuit PX can include an organic light-emitting diode element, a first transistor T1, a second transistor T2, a third transistor T3, and a capacitor C1. In this regard, the first transistor T1 can act as a driving transistor that supplies a driving current to an organic light-emitting diode.

A first electrode of the first transistor T1 can be connected to a power line and receive power voltage ELVDD therefrom, a second electrode thereof can be connected to a first node N1, and a gate electrode thereof can be connected to a second node N2.

Further, a first electrode of the second transistor T2 can be connected to the data line DL, a second electrode thereof can be connected to the second node N2, and a gate electrode thereof can be connected to a gate line GL.

A first electrode of the third transistor T3 can be connected to the first node N1, a second electrode thereof can be connected to the sensing line SL, and a gate electrode thereof can be connected to a sensing control line. In this regard, the sensing control line can be the gate line GL.

The capacitor C1 can be connected to and disposed between the first node N1 and the second node N2. Further, the data line DL connected to the pixel PX can be connected to a digital-to-analog converter DAC of the source driver SDIC. The sensing line SL can be connected to an analog-to-digital converter ADC of the sensing circuit 200. A sampling switch SW can be connected to and disposed between the sensing line SL and the analog-to-digital converter ADC.

When an initialization signal is transmitted to the pixel via the data line DL while a gate signal has been transmitted thereto via the gate line GL, the pixel PX operates in an initialization mode such that voltage stored in the capacitor C1 is initialized.

The initialization mode is terminated while the gate signal is maintained through the gate line GL, and the pixel operates in a display mode, such that the source signal VDATA can be transmitted to the second node N2 via the data line DL. In the initialization mode and the display mode, the sampling switch SW can keep an off state thereof.

Then, the pixel PX operates in a sensing mode. Thus, the characteristic of the threshold voltage and the electron mobility of the first transistor T1 or the characteristic of the threshold voltage of the organic light-emitting diode can be transmitted to the analog-to-digital converter ADC of the sensing circuit 200 connected to the sensing line SL via the sensing line SL.

The organic light-emitting diode included in the pixel PX can be degraded as a light-emitting time elapses. Further, when a constant current flows in the organic light-emitting diode, a degradation amount thereof can be larger. Then, since the sensing line SL is connected to the first node N1 via the third transistor T3, voltage applied to the first node N1 can be transmitted to the sensing circuit 200. Further, a magnitude of current flowing from the first node N1 to a cathode electrode of the organic light-emitting diode can be sensed and the sensed magnitude can be used to determine the degradation of the organic light-emitting diode.

In one example, FIG. 3 illustrates a pixel circuit of 3T1C including three transistors and one capacitor. However, the present disclosure is not limited thereto. In another example, a display device according to an embodiment can employ a display panel including various types of pixel circuits for performing internal compensation or external compensation for pixel degradation.

Further, FIG. 3 illustrates that a pixel signal is sensed via a separate sensing line SL. However, the present disclosure is not limited thereto. In another example, a display device according to an embodiment can employ a display panel for sensing a pixel signal via the data line DL or sensing a pixel signal via one sensing line SL for a plurality of pixel circuits.

Figure 4:
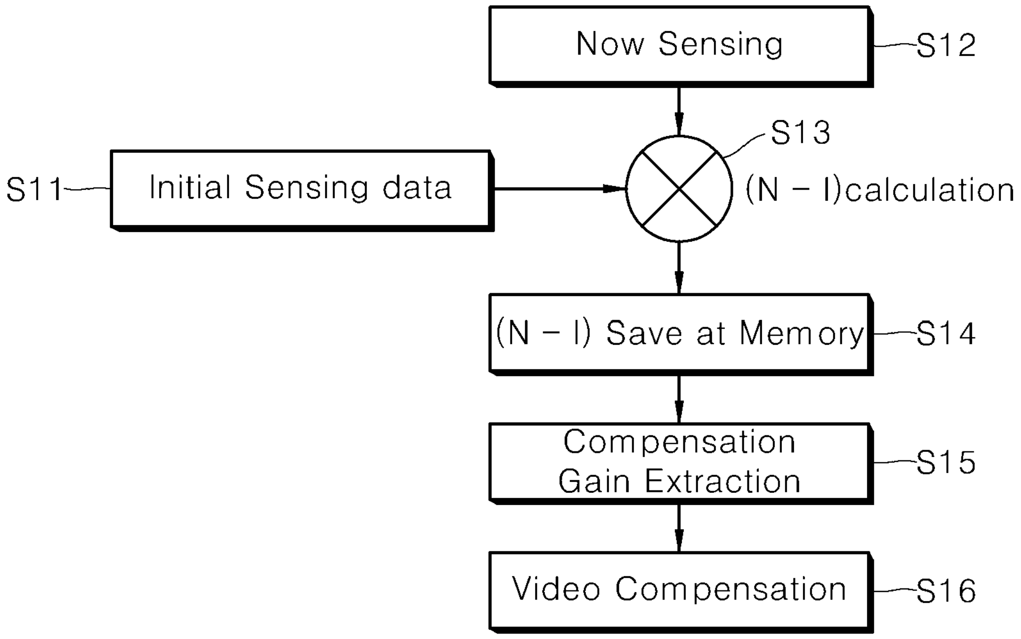
FIG. 4 is a flowchart showing a degradation compensation operation of a degradation compensation circuit according to one embodiment of the present disclosure.
Figure 5:
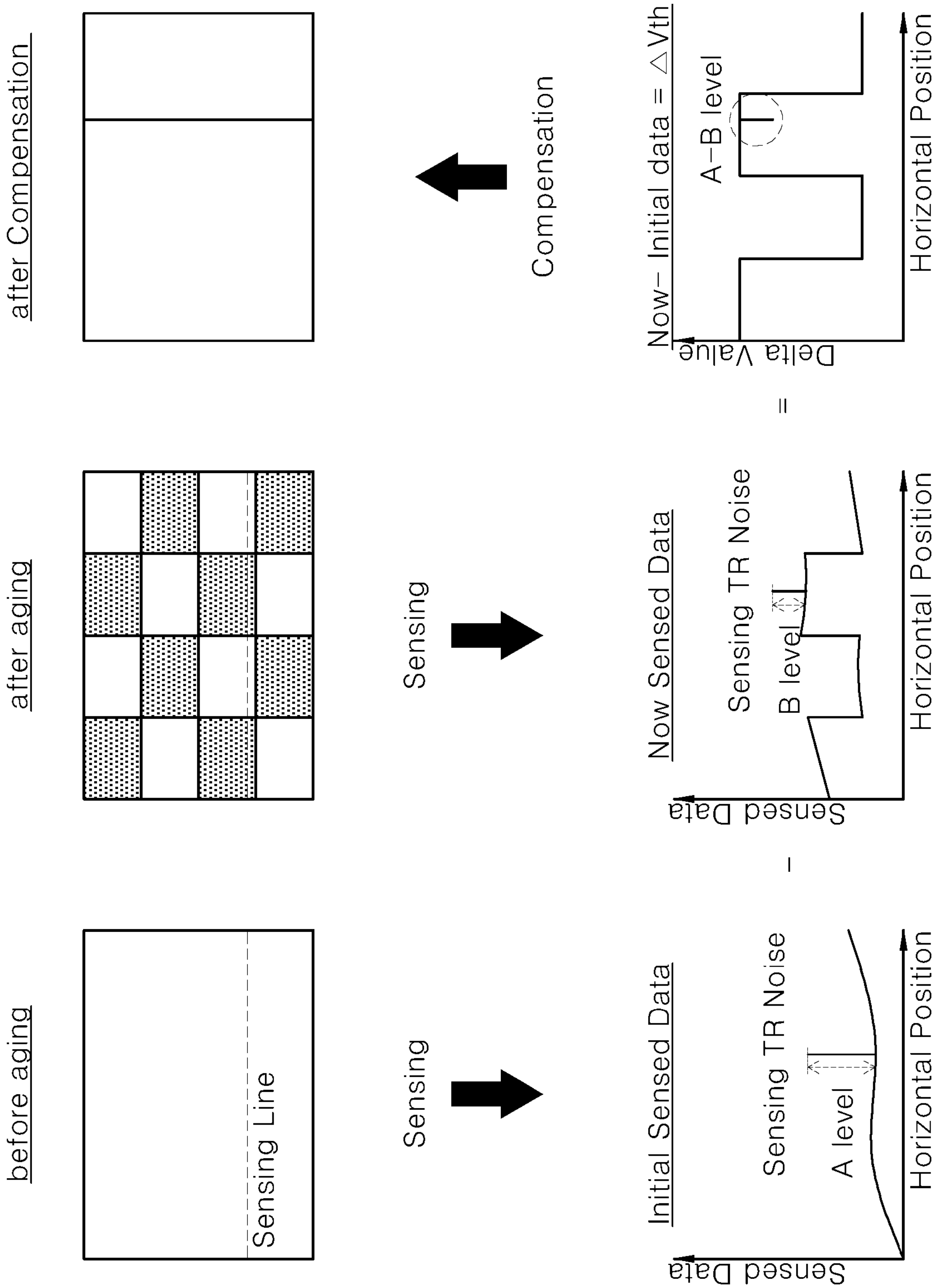
FIG. 5 is a waveform diagram related to the degradation compensation operation of the degradation compensation circuit according to one embodiment of the present disclosure.

FIG. 4 is a flowchart showing a degradation compensation operation of the degradation compensation circuit 100 according to one embodiment. FIG. 5 is a waveform diagram related to the degradation compensation operation of the degradation compensation circuit 100 according to one embodiment.

Referring to FIG. 4 and FIG. 5, the degradation compensation circuit 100 receives the initial sensed data SEN1 corresponding to the characteristic of the display panel 300 from the sensing circuit 200 during the initial operation of the display device in S11.

Then, the degradation compensation circuit 100 receives the current sensed data SEN2 corresponding to the degradation of the display panel 300 from the sensing circuit 200 during the degradation compensation period of the display device in S12.

Then, the degradation compensation circuit 100 calculates a difference between the current sensed data SEN2 and the initial sensed data SEN1 in S13 and stores the difference in a memory in S14. For example, the memory can disposed in the degradation compensation circuit 100, or can be disposed outside the degradation compensation circuit 100 and connected to the degradation compensation circuit 100.

Then, the degradation compensation circuit 100 extracts a compensation gain corresponding to the difference in S15. Compensation gain values corresponding to difference values between the current sensed data SEN2 and the initial sensed data SEN1 can be stored, in a form of a lookup table, in the memory.

Then, the degradation compensation circuit 100 applies the compensation gain to the image data in S16.

The initial sensed data SEN1 can mean sensed data before aging, and the current sensed data SEN2 can mean sensed data after aging.

The degradation compensation circuit 100 calculates a difference between the sensed data of the OLED element before and after aging, and compensates for the degradation based on the difference.

In one example, noise can occur due to damage to a transistor of a specific line in an initial stage. Then, in a subsequent aging stage, characteristics of the transistor of the same line can change, and thus a noise level can change. For example, the characteristics of the transistor can change due to loss of the static electricity or change in a temperature of the transistor.

Then, when there is the variation in the noise level at the same location, a threshold voltage variation ΔVth can change such that a vertical line can occur, as shown in FIG. 5. For example, in the OLED panel, a transistor in the panel can be damaged due to inflow of static electricity into the panel during a process. When the transistor characteristic momentarily changes due to the static electricity, this results in the noise in the sensed data.

However, when the static electricity accumulated in the transistor has been discharged after a certain period of time, the transistor characteristic returns to its original state, and thus the noise disappears in the sensed data.

In this manner, when a specific transistor of a sample has first the noise during a process, and then, the noise disappears after a certain period of time, a difference value between the current sensed data SEN2 and the initial sensed data SEN1 can change in the degradation compensation. Thus, accurate degradation compensation may not be achieved.

Accordingly, the present disclosure discloses the degradation compensation circuit capable of eliminating the noise included in the sensed data and/or an effect of the noise on the degradation compensation and the display device including the same.

Figure 6:
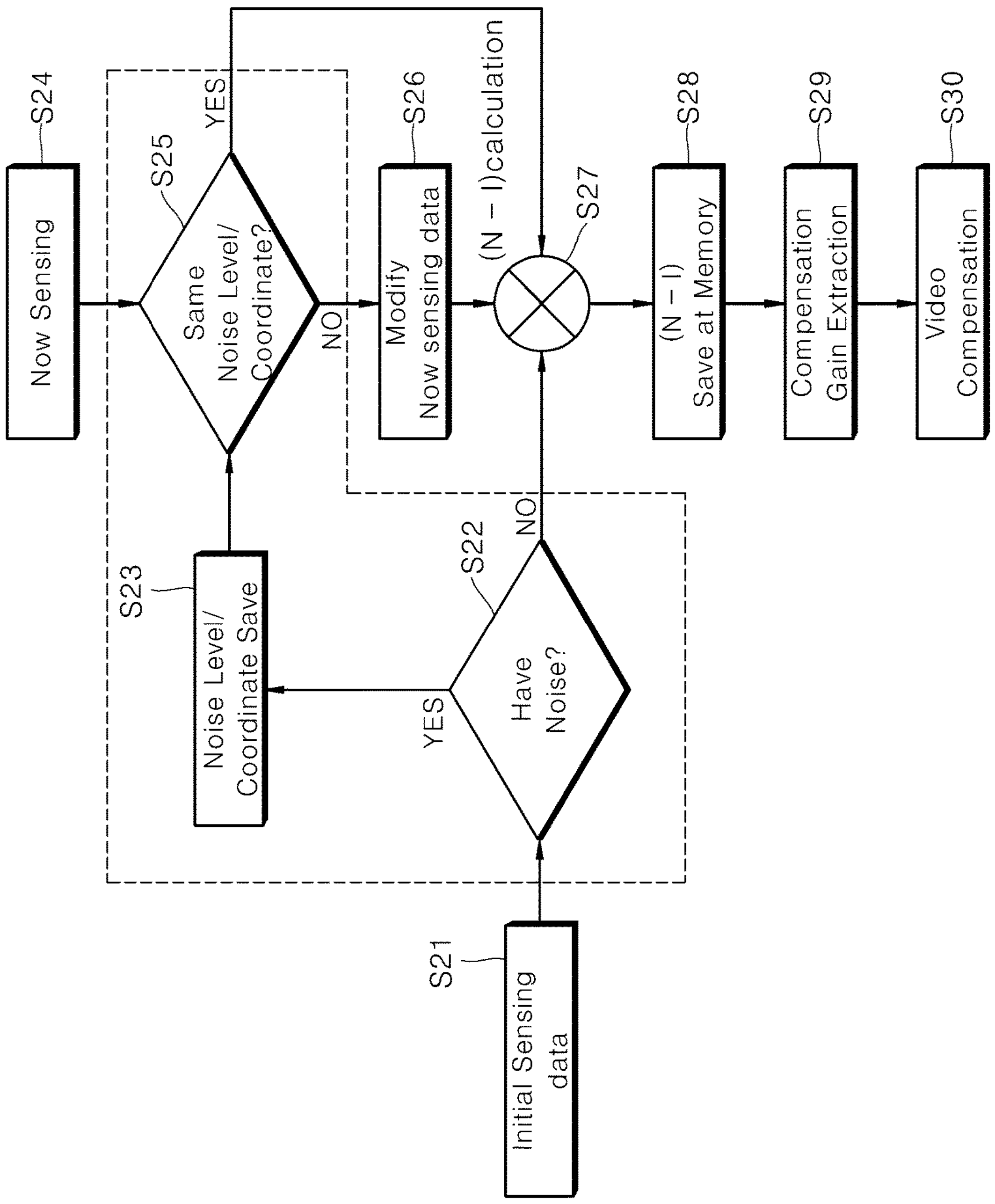
FIG. 6 is a flowchart showing a degradation compensation operation of a degradation compensation circuit according to another embodiment of the present disclosure.
Figure 7:
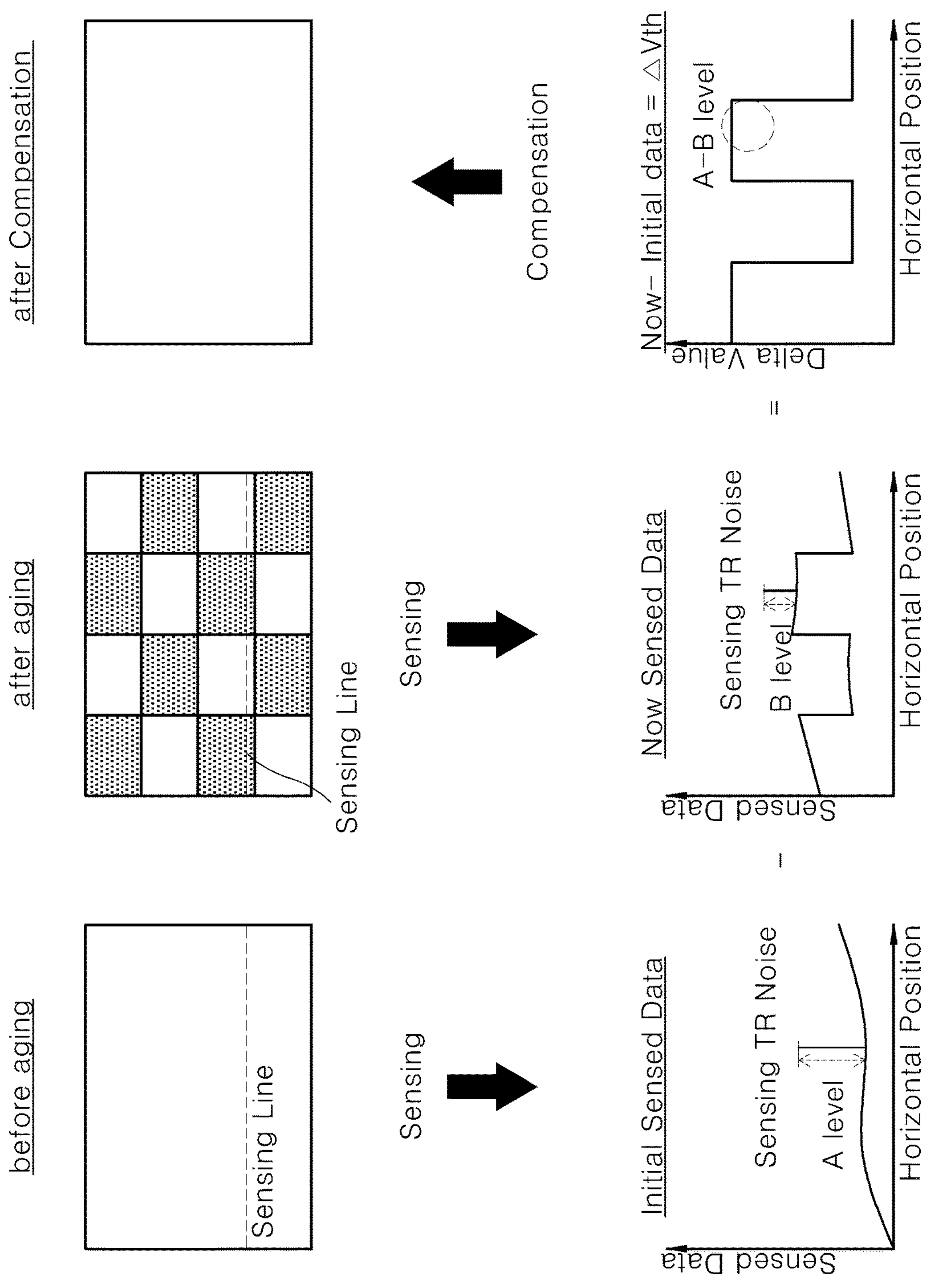
FIG. 7 is a waveform diagram related to the degradation compensation operation of the degradation compensation circuit according to another embodiment of the present disclosure.

FIG. 6 is a flowchart showing a degradation compensation operation of the degradation compensation circuit according to another embodiment. FIG. 7 is a waveform diagram related to the degradation compensation operation of the degradation compensation circuit according to another embodiment.

Referring to FIG. 6 and FIG. 7, the degradation compensation circuit 100 receives the initial sensed data SEN1 corresponding to the characteristic of the display panel 300 from the sensing circuit 200 during the initial operation of the display device in S21.

In this regard, the degradation compensation circuit 100 determines whether noise is included in the initial sensed data SEN1 in S22. In one example, when the initial sensed data SEN1 exceeds a reference value, the degradation compensation circuit 100 can determine that the noise is included in the initial sensed data SEN1 at each pixel coordinate.

More specifically, the degradation compensation circuit 100 can compare the initial sensed data SEN1 of a specific pixel coordinate with the initial sensed data SEN1 of another pixel coordinate. Then, when a difference therebetween exceeds a reference value, the degradation compensation circuit 100 can determine that noise is included in the initial sensed data SEN1 of the specific pixel coordinate. The reference value can be preset in the memory.

Then, when it is determined that the noise is included in the initial sensed data SEN1 of a specific pixel, the degradation compensation circuit 100 stores a first noise level of the initial sensed data SEN1 and a coordinate of the specific pixel in S23. In one example, the degradation compensation circuit 100 can determine whether or not noise is included in the initial sensed data SEN1 of each of all pixels, and can store a noise level and a pixel coordinate of each of pixels as determined to have the noise in the memory.

Then, the degradation compensation circuit 100 receives the current sensed data SEN2 corresponding to the degradation of the display panel 300 from the sensing circuit 200 during the degradation compensation period of the display device in S24.

Then, the degradation compensation circuit 100 determines whether a second noise level of the current sensed data SEN2 is equal to the first noise level of the initial sensed data SEN1 at each pixel in S25.

In this regard, the degradation compensation circuit 100 can determine a pixel at which the second noise level of the current sensed data SEN2 is not equal to the first noise level of the initial sensed data SEN1, and can correct the second noise level of the current sensed data SEN2 of the determined pixel to the first noise level thereof in S26.

Then, after correcting the second noise level of the current sensed data SEN2 to the first noise level, the degradation compensation circuit 100 can calculate a difference between the current sensed data SEN2 and the initial sensed data SEN1 in S27. In this regard, a noise component can be eliminated in a degradation compensation process.

Then, when the second noise level of the current sensed data SEN2 and the first noise level of the initial sensed data SEN1 are equal to each other, the degradation compensation circuit 100 can calculate the difference between the current sensed data SEN2 and the initial sensed data SEN1 in S27.

Then, the degradation compensation circuit 100 stores the difference value between the current sensed data SEN2 and the initial sensed data SEN1 in the memory in S28.

Then, the degradation compensation circuit 100 extracts a compensation gain corresponding to the difference value from the lookup table in S29. In this regard, compensation gain values corresponding to difference values between current sensed data SEN2 and initial sensed data SEN1 can be set in the lookup table.

Then, the degradation compensation circuit 100 compensates for the RGB image data based on the compensation gain value in S30.

Then, the degradation compensation circuit 100 can provide compensated image data RGB to the source driver SDIC.

As described above, when the noise is included in the initial sensed data SEN1, the degradation compensation circuit 100 and the display device including the same can correct the noise level of the current sensed data SEN2 to the noise level of the noise included in the initial sensed data SEN1 and maintain the corrected noise level of the current sensed data SEN2. Thus, the noise can be canceled when the difference between the initial sensed data SEN1 and the current sensed data SEN2 is calculated.

Further, the degradation compensation circuit 100 according to one embodiment and the display device including the same can remove the noise of the sensed data to accurately compensate for the degradation characteristic of each pixel.

One aspect of the present disclosure provides a degradation compensation circuit 100 for compensating for degradation of a display device, the degradation compensation circuit 100 configured to receive initial sensed data SEN1 indicating characteristic of a display panel 300 from a sensing circuit 200 for sensing a pixel signal of the display panel 300, store therein a first noise level of the initial sensed data SEN1 at each pixel coordinate, receive current sensed data SEN2 indicating degradation of the display panel 300 from the sensing circuit 200, correct a second noise level of the current sensed data SEN2 to the first noise level of the initial sensed data SEN1, calculate a difference between the current sensed data SEN2 and the initial sensed data SEN1, and extract degradation compensation data corresponding to the difference, for example, for compensating for the degradation of the display device. For example, the degradation compensation circuit 100 can store the first noise level of the initial sensed data SEN1 at each pixel coordinate in a memory disposed in the degradation compensation circuit 100.

In one embodiment of the degradation compensation circuit 100, the degradation compensation circuit 100 is further configured to when noise is included in the initial sensed data SEN1, store therein the first noise level of the initial sensed data SEN1 and a pixel coordinate of a pixel having the first noise level.

In one embodiment of the degradation compensation circuit 100, the degradation compensation circuit 100 is further configured to when the initial sensed data SEN1 at a pixel coordinate exceeds a reference value, determine that noise is included in the initial sensed data SEN1 at the pixel coordinate.

In one embodiment of the degradation compensation circuit 100, the degradation compensation circuit 100 is further configured to compare the second noise level and the first noise level at each pixel coordinate with each other, and when second noise level and the first noise level are not equal to each other, correct the second noise level to the first noise level.

In one embodiment of the degradation compensation circuit 100, the degradation compensation circuit 100 is further configured to calculate a difference between the initial sensed data SEN1 and the current sensed data SEN2, and remove noise included in the difference.

In one embodiment of the degradation compensation circuit 100, the degradation compensation circuit 100 is further configured to store therein a value of the difference at each pixel coordinate.

In one embodiment of the degradation compensation circuit 100, the degradation compensation circuit 100 is further configured to extract the degradation compensation data corresponding to the value of the difference from a preset lookup table, and apply the degradation compensation data to image data.

In one embodiment of the degradation compensation circuit 100, the degradation compensation circuit 100 is further configured to receive the initial sensed data SEN1 from the sensing circuit 200 sensing the pixel signal of the display panel 300 during an initial operation of the display panel 300, and determine whether the first noise level is present, for example, whether the first noise level is zero, based on the received initial sensed data SEN1.

In one embodiment of the degradation compensation circuit 100, the degradation compensation circuit 100 is further configured to receive the current sensed data SEN2 from the sensing circuit 200 in a preset period of a display period after the initial operation of the display panel 300, and compare the second noise level with the first noise level with each other.

Another aspect of the present disclosure provides a display device including a display panel 300 including a plurality of pixels, a sensing circuit 200 for sensing a pixel signal from the display panel 300, converting the pixel signal into sensed data, and providing the sensed data as initial sensed data SEN1 or current sensed data SEN2, and a degradation compensation circuit 100 for compensating for degradation of the display panel 300, wherein the degradation compensation circuit 100 is configured to receive the initial sensed data SEN1 indicating characteristic of the display panel 300, store a first noise level of the initial sensed data SEN1 at each pixel coordinate in a memory, receive the current sensed data SEN2 indicating degradation of the display panel 300 from the sensing circuit 200, correct a second noise level of the current sensed data SEN2 to the first noise level of the initial sensed data SEN1, calculate a difference between the current sensed data SEN2 and the initial sensed data SEN1, and extract degradation compensation data corresponding to the difference, for example, for compensating for the degradation of the display device.

In one embodiment of the display device, the degradation compensation circuit 100 is further configured to, when noise is included in the initial sensed data SEN1, store the first noise level of the initial sensed data SEN1 and a pixel coordinate of a pixel having the first noise level in the memory.

In one embodiment of the display device, the degradation compensation circuit 100 is further configured to, when the initial sensed data SEN1 exceeds a reference value at a pixel coordinate, determine that noise is included in the initial sensed data SEN1 at the pixel coordinate.

In one embodiment of the display device, the degradation compensation circuit 100 is further configured to compare the second noise level and the first noise level at each pixel coordinate with each other, and when second noise level and the first noise level are not equal to each other, correct the second noise level to the first noise level.

In one embodiment of the display device, the degradation compensation circuit 100 is further configured to calculate a difference between the initial sensed data SEN1 and the current sensed data SEN2, and remove noise included in the difference.

In one embodiment of the display device, the degradation compensation circuit 100 is further configured to store a value of the difference at each pixel coordinate in the memory.

In one embodiment of the display device, the degradation compensation circuit 100 is further configured to extract the degradation compensation data corresponding to the value of the difference from a preset lookup table, and apply the degradation compensation data to image data.

In one embodiment of the display device, the degradation compensation circuit 100 is further configured to receive the initial sensed data SEN1 from the sensing circuit 200 sensing the pixel signal of the display panel 300 during an initial operation of the display panel 300, and determine whether the first noise level is present based on the received initial sensed data SEN1.

In one embodiment of the display device, the degradation compensation circuit 100 is further configured to receive the current sensed data SEN2 from the sensing circuit 200 in a preset period of a display period after the initial operation of the display panel 300, and compare the second noise level with the first noise level with each other.

In one embodiment of the display device, the sensing circuit 200 is included in a source driver SDIC, the source driver SDIC outputs a source signal corresponding to image data to the display panel 300, the degradation compensation circuit 100 is included in a timing controller TCON, the timing controller TCON provides the image data to the source driver SDIC, and the degradation compensation circuit 100 is further configured to apply the degradation compensation data to the image data to obtain compensated image data, and supply the compensated image data to the source driver SDIC.

In one embodiment of the display device, the degradation compensation circuit 100 is included in a source driver SDIC, the source driver SDIC outputs a source signal corresponding to image data to the display panel 300, and the degradation compensation circuit 100 is further configured to apply the degradation compensation data to the image data received from the timing controller TCON.

An example in which the sensing circuit 200 is included in the source driver SDIC and the degradation compensation circuit 100 is included in the timing controller TCON has been described above. However, the present disclosure is not limited thereto. The sensing circuit 200 and the degradation compensation circuit 100 can be included in at least one of a source driver, a gate driver and a timing controller. Alternatively, the sensing circuit 200 and the degradation compensation circuit 100 can be included in the same separate integrated circuit.

A scope of protection of the present disclosure should be construed by the scope of the claims, and all technical ideas within the scope equivalent thereto should be construed as being included in the scope of the present disclosure. Although the embodiments of the present disclosure have been described in more detail with reference to the accompanying drawings, the present disclosure is not necessarily limited to these embodiments. The present disclosure can be implemented in various modified manners within the scope not departing from the technical idea of the present disclosure. Accordingly, the embodiments disclosed in the present disclosure are not intended to limit the technical idea of the present disclosure, but to describe the present disclosure. The scope of the technical idea of the present disclosure is not limited by the embodiments.

Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A degradation compensation circuit for compensating for degradation of a display device, the degradation compensation circuit configured to:

receive initial sensed data for each individual pixel of a plurality of pixels of a display panel from a sensing circuit configured to sense pixel signals corresponding to respective driving currents flowing through individual pixels of the plurality of pixels, the initial sensed data indicating characteristics of individual pixels;

compare the initial sensed data for the plurality of pixels;

determine that noise is included in the initial sensed data of a corresponding pixel in response to a first difference among the initial sensed data of the corresponding pixel exceeding a reference value;

store, in a memory, a first noise level of the initial sensed data exceeding the reference value and a respective pixel coordinate of the corresponding pixel in response to noise being determined to be included in the initial sensed data;

receive current sensed data for each pixel coordinate from the sensing circuit, the current sensed data indicating a degradation of each individual pixel of the plurality of pixels of the display panel;

modify a second noise level of the current sensed data corresponding to the pixel coordinate where the first noise level is stored, to the first noise level of the initial sensed data;

calculate a second difference between the current sensed data and the initial sensed data for each individual pixel of the plurality of pixels;

remove noise included in the current sensed data using the second difference for each individual pixel of the plurality of pixels; and extract degradation compensation data for each individual pixel of the plurality of pixels based on the second difference.

2. The degradation compensation circuit of claim 1, wherein the degradation compensation circuit is further configured to store therein a value of the second difference for each pixel coordinate.

3. The degradation compensation circuit of claim 2, wherein the degradation compensation circuit is further configured to:

extract the degradation compensation data corresponding to the value of the second difference from a preset lookup table; and apply the degradation compensation data to image data.

4. The degradation compensation circuit of claim 1, wherein the degradation compensation circuit is further configured to:

receive the initial sensed data from the sensing circuit sensing a pixel signal of the display panel during an initial operation of the display panel; and determine that the initial sensed data of the corresponding pixel contains noise in response to data exceeding the reference value among the initial sensed data for the plurality of pixels.

5. The degradation compensation circuit of claim 4, wherein the degradation compensation circuit is further configured to:

receive the current sensed data from the sensing circuit in a preset period of a display period after the initial operation of the display panel; and modify the current sensed data of the corresponding pixel containing the noise to the first noise level.

6. A display device, comprising the degradation compensation circuit of claim 1.

7. The display device of claim 6, further comprising the display panel, which is an organic light-emitting diode display panel.

8. The degradation compensation circuit of claim 1, wherein the initial sensed data for each of the plurality of pixels includes at least one of a threshold voltage of an organic light-emitting diode and a threshold voltage and mobility of a driving transistor.

9. A display device comprising:

a display panel including a plurality of pixels;

a sensing circuit configured to sense pixel signals corresponding to driving currents flowing through individual pixels of the plurality of pixels from the display panel, convert the sensed pixel signals into sensed data, and provide the sensed data as initial sensed data or current sensed data; and a degradation compensation circuit configured to compensate for a degradation of each of the plurality of pixels of the display panel, wherein the degradation compensation circuit is configured to:

compare the initial sensed data for the plurality of pixels;

determine that noise is included in the initial sensed data of a corresponding pixel in response to a first difference among the initial sensed data of the corresponding pixel exceeding a reference value;

store, in a memory, a first noise level of the initial sensed data exceeding the reference value and a respective pixel coordinate of the corresponding pixel in response to noise being determined to be included in the initial sensed data;

receive current sensed data for each pixel coordinate from the sensing circuit, the current sensed data indicating a degradation of each individual pixel of the plurality of pixels of the display panel;

modify a second noise level of the current sensed data corresponding to the pixel coordinate where the first noise level is stored, to the first noise level of the initial sensed data;

calculate a second difference between the current sensed data and the initial sensed data for each individual pixel of the plurality of pixels;

remove noise included in the current sensed data using the second difference for each individual pixel of the plurality of pixels; and extract degradation compensation data for each individual pixel of the plurality of pixels based on the second difference.

10. The display device of claim 9, wherein the degradation compensation circuit is further configured to store a value of the second difference for each pixel coordinate in the memory.

11. The display device of claim 10, wherein the degradation compensation circuit is further configured to:

extract the degradation compensation data corresponding to the value of the second difference from a preset lookup table; and apply the degradation compensation data to image data.

12. The display device of claim 9, wherein the degradation compensation circuit is further configured to:

receive the initial sensed data from the sensing circuit sensing the pixel signal of the display panel during an initial operation of the display panel; and determine that the initial sensed data of the corresponding pixel contains noise when there is data exceeding the reference value among the initial sensed data for the plurality of pixels.

13. The display device of claim 12, wherein the degradation compensation circuit is further configured to:

receive the current sensed data from the sensing circuit in a preset period of a display period after the initial operation of the display panel; and modify the current sensed data of the corresponding pixel containing the noise to the first noise level.

14. The display device of claim 9, wherein the sensing circuit is included in a source driver, and the source driver outputs a source signal corresponding to image data to the display panel and receives the pixel signal for the plurality of pixels from the display panel, wherein the degradation compensation circuit is included in a timing controller, and the timing controller provides the image data to the source driver, and wherein the degradation compensation circuit is further configured to:

apply the degradation compensation data to the image data to obtain compensated image data; and supply the compensated image data to the source driver.

15. The display device of claim 9, wherein the degradation compensation circuit is included in a source driver, and the source driver outputs a source signal corresponding to image data to the display panel, and wherein the degradation compensation circuit is further configured to apply the degradation compensation data to the image data received from a timing controller.

* * * * *